(12) United States Patent
Davies

(10) Patent No.: US 8,360,305 B2
(45) Date of Patent: Jan. 29, 2013

(54) METHOD AND APPARATUS FOR REFLOW SOLDERING

(76) Inventor: Kevin Stephen Davies, Duncraig (AU)

( * ) Notice: Subject to any disclaimer, the term of this patent is extended or adjusted under 35 U.S.C. 154(b) by 0 days.

(21) Appl. No.: 13/139,025

(22) PCT Filed: Dec. 10, 2009

(86) PCT No.: PCT/AU2009/001603
§ 371 (c)(1),
(2), (4) Date: Jun. 10, 2011

(87) PCT Pub. No.: WO2010/066002
PCT Pub. Date: Jun. 17, 2010

(65) Prior Publication Data
US 2011/0248074 A1 Oct. 13, 2011

(30) Foreign Application Priority Data

| Dec. 10, 2008 | (AU) | 2008906355 |
| Jan. 16, 2009 | (AU) | 2009900168 |
| Jul. 9, 2009 | (AU) | 2009903226 |

(51) Int. Cl.
*B23K 31/02* (2006.01)
(52) U.S. Cl. ............... 228/256; 228/42; 228/219
(58) Field of Classification Search ........ 228/256, 228/42, 219
See application file for complete search history.

(56) References Cited

U.S. PATENT DOCUMENTS

| 4,327,271 A | 4/1982 | Bentley et al. |
| 4,755,261 A | 7/1988 | McCord et al. |
| 5,524,812 A | 6/1996 | Taniguchi et al. |

FOREIGN PATENT DOCUMENTS

| EP | 0023107 A1 | 1/1981 |
| JP | 07-326857 A | 12/1995 |

OTHER PUBLICATIONS

International Search Report and International Searching Authority Written Opinion dated Mar. 16, 2010 in corresponding International Patent Application No. PCT/AU2009/001603, filed on Dec. 10, 2009, 9 pages.
Response to the Written Opinion from corresponding International Patent Application No. PCT/AU2009/001603, filed on Dec. 10, 2009, Sep. 30, 2010, 2 pages.

*Primary Examiner* — Nicholas P D'Aniello
(74) *Attorney, Agent, or Firm* — Maier & Maier PLLC

(57) ABSTRACT

Reflow soldering apparatus comprising a vapour chamber in communication with a reservoir of heat transfer fluid such that a volume of vaporised heat transfer fluid is created and held in the vapour chamber by heating of the heat transfer fluid. A heating chamber is provided for receiving a board and a transportation mechanism is provided to transport vapour, and condensate formed from the vapour, from the volume of vaporised heat transfer fluid to the heating chamber. The transported vapour and condensate applies heat to the heating chamber for the reflow soldering process.

18 Claims, 2 Drawing Sheets

METHOD AND APPARATUS FOR REFLOW SOLDERING

RELATED APPLICATIONS

This is the U.S. national stage application claims priority, under 35 U.S.C. §371, to International Patent Application No.: PCT/AU2009/001603, filed on Dec. 10, 2009, which claims priority to Australian Patent Application No(s).: 2008906355, filed Dec. 10, 2008; 2009900168, filed Jan. 16, 2009; and 2009903226, filed Jul. 9, 2009, the disclosures of which are incorporated by references herein in their entireties.

FIELD OF THE INVENTION

The present invention relates to a method and apparatus for reflow soldering.

BACKGROUND TO THE INVENTION

Reflow soldering is a commonly used process for connecting components to a circuit board. The components are placed on solder paste located on the circuit board and the board is heated in an oven to melt the solder and thereby connect the components.

The ovens used are arranged to provide some control over the temperature throughout the process. Producing the correct temperature profile for the process is extremely important to producing good connections between the components and the board. A common process uses an initial preheat zone in which the temperature is ramped up, a thermal soak zone in which temperature is maintained relatively constant and a reflow zone in which the temperature is ramped up again to melt the solder. The rate of increase of temperature in the preheat and reflow zones is particularly important in obtaining good connections. A final cooling zone is also used to cool down the board and components. Again, the rate of cooling is important to the connection quality.

A number of different ovens for this purpose are available which use different methods of heating the board. Convection and infrared radiation are two such methods which have been employed either separately or in combination. Ovens using these heating techniques may utilise a method of moving the board through various zones in the oven in order to provide the different temperatures required at the various stages of the process.

A further method involves the use of vapour phase heating. In such an oven, a liquid with a predefined boiling point is heated until a vapour of the liquid is formed. The liquid used is one such that the vapour produced is heavier than air and therefore forms a vapour layer which sits above the liquid in a vessel. The board is then lowered into the vapour layer to apply heating. In order to control the temperature of the board throughout the process, a means of moving the board in and out of the formed vapour layer may be employed.

Vapour phase ovens are known to have poor control of the temperature profile causing problems such as thermal shock to parts and increased tombstoning (being parts standing up during the reflow process) compared to convection ovens.

Infrared and convection ovens result in higher peak temperatures and variations in peak temperatures and temperature profiles for parts across the PCBs and this leads to higher failure rates.

The present invention relates to an improved method and apparatus for applying heat to a circuit board for the purpose of reflow soldering.

SUMMARY OF THE INVENTION

According to one aspect of the present invention there is provided reflow soldering apparatus comprising:

a vapour chamber in communication with a reservoir of heat transfer fluid such that a volume of vaporised heat transfer fluid is created and held in the vapour chamber by heating of the heat transfer fluid;

a heating chamber for receiving a board; and a transportation mechanism arranged to transport vapour, and/or condensate formed from the vapour, from the volume of vaporised heat transfer fluid to the heating chamber;

wherein transported vapour applies heat to the heating chamber for the reflow soldering process.

Preferably the transportation mechanism comprises a pressurising device to create a pressure differential between the vapour chamber and the heating chamber such that vapour and/or condensate are transported by the pressure differential.

Preferably the heating chamber is of low thermal mass and/or lined with material having low thermal conductivity so temperature profiles remain constant throughout the chamber during temperature cycling. The sides and any observation windows may be lined with reflective material to reduce temperature variations caused by radiant heat loss.

Preferably the pressurising device comprises a first fan and a first conduit is provided connecting the vapour chamber and the heating chamber such that operation of the first fan causes vapour from the vapour layer to be transported to the heating chamber via the first conduit. A second conduit is preferably provided connecting an upper end of the vapour chamber with the heating chamber, the second conduit including the first fan which is operated to pressurise the air above the vapour layer such that vapour passes via the first conduit into the heating chamber.

Preferably operation of the first fan is varied to control the rate of vapour delivered to the heating chamber, thereby regulating the heat applied to the board.

In one embodiment, there is provided a cooling system conduit including a cooling system fan, the cooling system conduit including a cooling means to cool air passing through the cooling system conduit.

In a preferred embodiment, the heating chamber is provided with a circulation fan to circulate the vapour around the heating chamber. Preferably the operation of the circulation fan is varied to regulate the heat applied to the board.

In one embodiment, the circulation fan is provided within the heating chamber. The first conduit preferably connects a lower end of the heating chamber with the vapour chamber such that condensate falling to the lower end of the heating chamber will return to the vapour chamber via the first conduit. The first conduit may be provided with a flow diverter adjacent the upper end such that when the circulation fan is circulating air and condensate within the heating chamber in a first direction, the diverter limits air and condensate passing into the return conduit. Preferably the diverter is arranged such that when the circulation fan is reversed, the flow is directed down the first conduit.

A cooling chamber is preferably provided in the cooling system conduit and the cooling system fan draws air from the heating chamber into the cooling chamber from which it is returned via a cooling return conduit. The cooling chamber may be provided with an expansion bladder or vent to allow for changes in volume in the heating and cooling process In a further embodiment, the heating chamber is provided with a first internal chamber at a first end thereof and a second internal chamber at a second end thereof, each of the first and second internal chambers including apertures into the heating chamber, wherein the circulation fan is provided in a circulation conduit connecting the first and second internal chambers such that operation of the circulation fan causes air flow from the first end of the heating chamber to the second end.

A condensation trap may also be provided adjacent the upper end of the vapour chamber and a condensate return line having a second fan may be provided extending from the heating chamber to the vapour chamber below the condensation trap such that slowing operation of the first fan relative to the second fan causes air to flow up through the condensation trap and into the second internal chamber via the second conduit.

Preferably the cooling system conduit connects from the second internal chamber to the first internal chamber.

In one embodiment, a third fan is provided within the first conduit and the third fan and the second fan are run to draw vapour back into the vapour chamber.

A temperature sensor may be provided in the heating chamber such that temperature information provided by the temperature sensor is used to control operation of the first and cooling system fans and thereby the temperature around the board in the heating chamber.

According to a further aspect of the present invention, there is provided a method of reflow soldering comprising the steps of:

heating of a heat transfer fluid to create and hold a volume of vaporised heat transfer fluid in a vapour chamber;

placing a board to be soldered in a separate heating chamber; and transporting vapour, and/or condensate formed from the vapour, from the vapour chamber to the heating chamber;

wherein heat transfer fluid applies heat to the board for the reflow soldering process.

Preferably a pressure differential is created between the vapour chamber and the heating chamber such that vapour and/or condensate are transported by the pressure differential.

Preferably a first conduit is provided connecting the vapour chamber and the heating chamber and a first fan is provided such that operation of the first fan creates the pressure differential to transport vapour to the heating chamber via the first conduit.

The vapour is preferably circulated in the heating chamber by a circulation fan to distribute heat evenly to the board. Preferably operation of the first fan is varied to control the volume of vapour delivered to the heating chamber, thereby regulating the heat applied to the board.

Further, the operation of the circulation fan is preferably varied to regulate the heat applied to the board.

There is also preferably provided a cooling system conduit including a cooling system fan, the cooling system conduit including a cooling means to cool air passing through the cooling system conduit and the cooling system fan is operated to cool the heating chamber.

BRIEF DESCRIPTION OF THE DRAWINGS

The invention will now be described, by way of example, with reference to the following drawings.

DETAILED DESCRIPTION OF PREFERRED EMBODIMENTS

Figure 1:
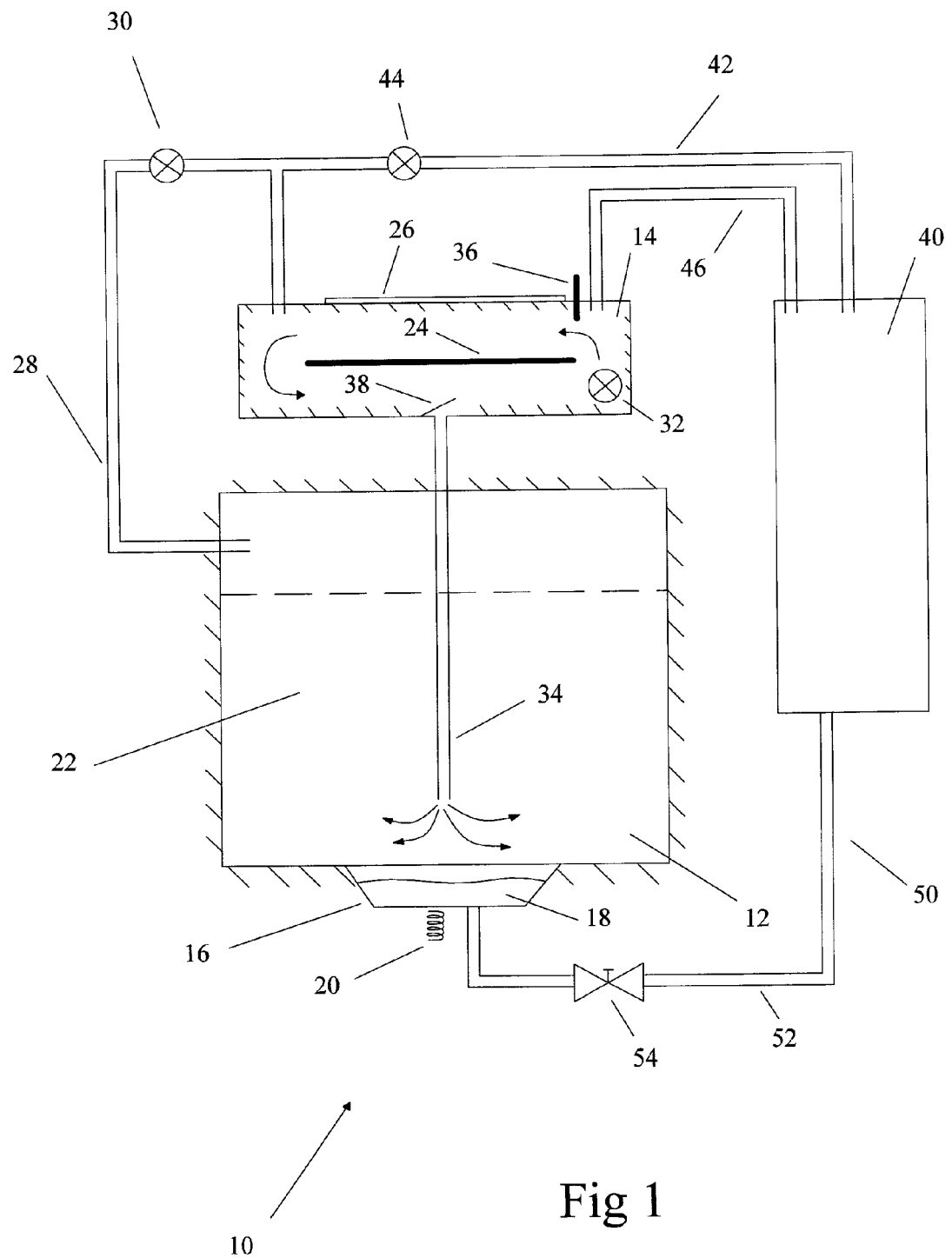
FIG. 1 is a diagrammatic view of apparatus for reflow soldering in accordance with the present invention.

Referring to FIG. 1 there is shown apparatus 10 for reflow soldering according to the method of the present invention.

The reflow soldering apparatus comprises a vapour chamber 12 and a heating chamber 14. The vapour chamber 12 is located below the heating chamber 14 and is used to produce a volume of vapour in a manner similar to that used in known vapour phase reflow soldering. That is, a reservoir 16 is provided adjacent a lower end of the vapour chamber 12 which is filled with a suitable heat transfer fluid 18. The heat transfer fluid may be of a known type such as that sold under the name Galden LS230.

The reservoir 16 includes a heating element 20 which applies heat to the heat transfer fluid 18. Once the fluid reaches its boiling point, which in the case of Galden LS230 is 230 degrees Celsius, a layer of vapour 22 is formed above the fluid 18. The vapour chamber 12 therefore is used to create and hold a volume of vapour for use in the reflow soldering process.

The heating chamber 14 receives a printed circuit board 24 which includes components and solder paste to undergo a reflow soldering process. The heating chamber 14 may include an upper door 26 through which the board 24 is placed into the heating chamber 14. The door 26 may include a window to allow the board 24 to be viewed during the soldering process.

The heating chamber 14 may be constructed from segments of stainless shim material, thinner than 0.3 mm. The segments would be joined by expansion joints. Also, the surfaces of the heating chamber 14 may be formed from curved surfaces to provide strength to reduce deformation that may be caused by the heating and cooling cycles.

The apparatus 10 includes a first conduit 34 connecting between a position adjacent the lower end of the vapour chamber 12 and a lower end of the heating chamber 14. The first conduit 34 is provided for delivering vapour created in the vapour chamber 12 to the heating chamber 14. Also provided is a second conduit 28 connecting an upper end of the vapour chamber 12 and an upper end of the heating chamber 14.

The apparatus 10 includes one or more pressurising devices provided to create a pressure differential between the heating chamber 14 and the vapour chamber 12 such that vapour from the vapour layer 22 passes through the first conduit 34 into the heating chamber 14.

In the embodiment shown, the pressurising device comprises a first fan 30 provided in the second conduit 28. The first fan 30 is operated to pressurise the air above the vapour layer 22 such that vapour passes up through the first conduit 34, the lower end of which is located below the top of the vapour layer 22, into the heating chamber 14.

In an alternative embodiment, the first fan 30 may be provided in the first conduit 34 to draw vapour up into the heating chamber 14.

The vapour 22 is delivered through the first conduit 34 to the heating chamber 14 in order to provide the heat to the board 24 for the reflow soldering process. As the vapour 22 enters the heating chamber 14, the vapour 22 will condense forming a suspension of condensed heat transfer fluid around the board 24. The heating chamber 14 is provided also with a circulation fan 32 in order to provide consistent temperature throughout the heating chamber 14 and to circulate the suspended condensate evenly around the heating chamber 14. The suspended condensate will come into contact with the board 24 rapidly delivering heat to the board 24.

The amount of vapour delivered to the heating chamber 14 is controlled by operation of the first fan 30, thereby allowing the amount of heat delivered to the board 24 to be controlled throughout the process. The operation of the circulation fan 32 is also controlled to further regulate the heat delivered to the board 24. The control of operation of the fans 30 and 32 thereby allows the temperature of the board to be varied according to the desired heating profile.

To reduce tombstoning, the board 24 is first heated according to the heating profile to just below the eutectic of the solder paste then the first fan 32 is stopped so the mixing action creating condensation ceases. The speed of the first fan 30 is increased so the heating chamber 14 is rapidly filled with the vapour to melt the solder paste evenly and quickly.

A temperature sensor 36 in the heating chamber 14 is also used to provide temperature information used in controlling operation of the first fan 30 and the circulation fan 32.

The condensed vapour which forms larger droplets throughout the process will fall to the lower end of the heating chamber 14 and can return to the vapour chamber 12 and the reservoir 16 via the first conduit 34. The first conduit 34 may be provided with a flow diverter 38 adjacent the upper end such that when the circulation fan 32 is circulating air and condensate within the heating chamber 14 in a first direction, the diverter 38 limits air and condensate passing into the return conduit 34. The diverter 38 is arranged such that when the circulation fan 32 is reversed, the flow is directed down the return conduit 34. Reversing of the direction of the circulation fan 32 therefore allows vapour to be directed back towards the vapour chamber 12. The bottom of the heating chamber 14 may also be sloped toward the first conduit 34 so that condensed vapour and fluid return to the vapour chamber 12.

The apparatus 10 is also provided with a cooling tank 40 connected to the heating chamber 14 by a cooling system conduit 42. The cooling system conduit 42 includes a cooling system fan 44 arranged such that operation of the cooling system fan 44 draws air from the heating chamber 14 into the cooling tank 40. A cooling return line 46 is also provided between the cooling tank 40 and the heating chamber 14. Operation of the cooling system fan 44 thereby draws air from the heating chamber 14 into the cooling chamber 40. Returned cooler air is delivered back to the heating chamber 14 to cool the interior of the heating chamber 14. Operation of the cooling system fan 44 can therefore be used to control the cooling phase of the reflow soldering process.

A return conduit 50 is provided between the cooling chamber 40 and the reservoir 16. The return conduit 50 is provided with a U moisture trap 52 and isolation valve 54 so that condensed vapour in the cooling chamber 40 returns to the vapour chamber 12.

The apparatus 10 may be provided with an outer casing (not shown) provided around both the heating chamber 14 and the vapour chamber 12. The cooling chamber 40 may be formed by the outer casing. To reduce heat loss and improve thermal control in the heating chamber 14, a layer of insulating material such as foam glass and/or reflective material may line the vapour and heating chambers 12 and 14. An air gap layer could be provided between the outer casing and the insulating material. Vapour from the heating chamber 14 could then be directed to flow through the air gap layer between the insulating material and the outer casing of the apparatus for the purposes of cooling and condensation. A filter material having a large surface area (such as a course stainless gauze) could be placed in the path of the cooling air for condensation to collect onto. Alternatively cooled air could be directed to flow through a fine pore material such as synthetic chamois.

The second conduit 28 and the cooling system conduit 42 may include a common entry to the heating chamber 14. This arrangement may be utilised to pump vapour formed in the vapour chamber 12 through the heating chamber 14 to the cooling chamber 40 for the purpose of removing impurities from the heat transfer fluid. In such an operation, the lid 26 is opened and the isolation valve 54 opened. Then heater 16 heats the heat transfer fluid 18 to above the volatile temperature of common impurities but below the boiling point of the heat transfer fluid and the first fan 30 and the cooling system fan 44 are operated to remove unwanted vapours from the system. When venting is complete the lid 26 is closed, isolation valve 54 closed and heat transfer fluid is heated until it all forms vapour and is transferred to the cooling tank 40 where it condenses and is prevented from returning. The apparatus is cooled and the reservoir 16 may be removed for cleaning. The reservoir 16 may then be replaced, the isolation valve 54 opened again and heat transfer fluid returned to the reservoir 16.

The cooling chamber 40 may be provided with an expansion bladder or vent (not shown) to allow for changes in volume during the cooling process. A vent may contain cooled material with a large surface area on which vapour can condense. The condensed vapour forms fluid and is returned to the reservoir 16.

A further fan (not shown) is provided between the system 10 and the expansion bladder or vent such that air is blown out of the system during the heating process. This ensures the system operates with a slight negative pressure during the reflow process, thereby reducing loss of heat transfer fluid 18.

Figure 2A:
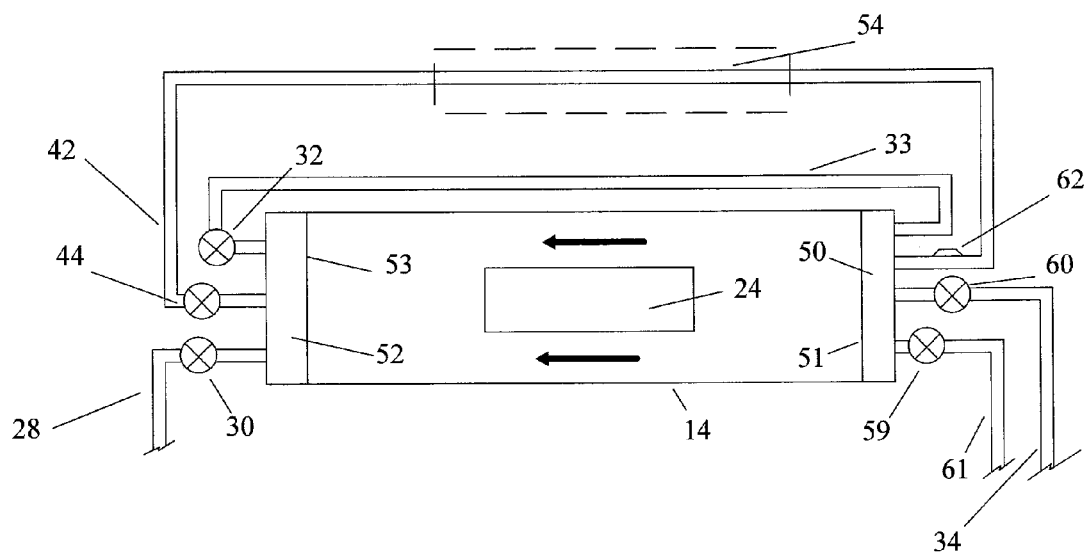
FIG. 2a is a top cross sectional view of a heating chamber of a second embodiment of the apparatus for reflow soldering.
Figure 2B:
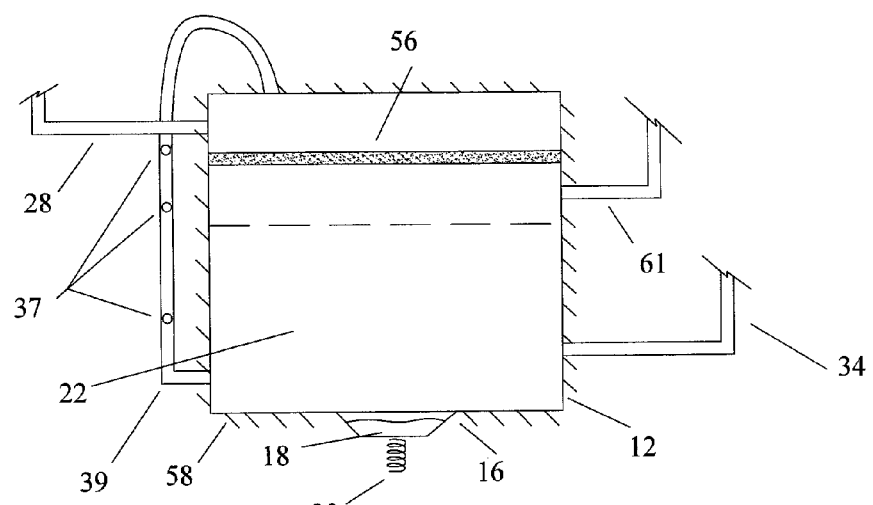
FIG. 2b is a side cross sectional view of the vapour chamber of the second embodiment.

FIGS. 2a and 2b show a second embodiment of apparatus for reflow soldering in accordance with the present invention. The apparatus is similar in function to that of FIG. 1 and like reference numerals are used to denote like parts.

FIG. 2a shows a top view of the heating chamber 14. The heating chamber is provided with a first internal chamber 50 at a first end thereof and a second internal chamber 52 at a second end opposite end thereof. Each of the first and second internal chambers 50 and 52 is defined by an associated internal wall 51 and 53 extending across the heating chamber 14. Each of the internal walls 51 and 53 includes a plurality of apertures such that air can flow through the apertures.

The circulation fan 32 in the second embodiment is provided externally of the heating chamber 14 and is connected to the first and second internal chambers 50 and 52 via a circulation conduit 33. Operation of the circulation fan 32 is such that a negative pressure is created in the second internal chamber 52 and a positive pressure in the first internal chamber 50. Air is thereby drawn through the apertures in the first wall 51 and flows along the heating chamber 14 into the apertures in the second wall 53. That is, air flows from the first end of the heating chamber 14 to the second end of the heating chamber 14 and is returned through the circulation conduit 33.

The first fan 30 is provided in the second conduit 28 which is connected to the second internal chamber 52. The first conduit 34 connects the first internal chamber 50 to the lower end of the vapour chamber 12. The first fan 30 operates to draw air from the second internal chamber 52 into the upper end of the vapour chamber 12 when it is required to transport vapour into the heating chamber 14. The vapour passes through the first conduit 34 into the first internal chamber 50 and then into the heating chamber 14 around the board.

The cooling system conduit 42 connects the first and second internal chambers 50 and 52 and includes the cooling system fan 44 inline to draw air from the second internal chamber 52 and direct it to the first internal chamber 50. The cooling system conduit 42 passes through a cooling device 54 to remove heat from the air drawn through the cooling system conduit 42. The cooling device 54 may comprise an outer casing provided around both the heating chamber 14 and the vapour chamber 12. The cooling system conduit 42 may be thermally connected to the outer casing or may connect to a chamber provided within the outer casing. Alternatively, a dedicated heat exchanger with associated fan may be provided as the cooling device.

The apparatus of FIG. 2 also includes a condensation trap 56 adjacent the upper end of the vapour chamber 12. The condensation trap 56 is provided to allow control over the level of condensation throughout the heating process as will be described below. As it is expected that the heat transferred to the board 24 will be related to the amount of condensation in the heating chamber 14, such control over the condensation level allows increased control over the heating profile. Also provided for this purpose is a condensate return line 61 extending from the heating chamber 14 to the vapour chamber 12 below the condensation trap 56. The condensate return line 61 includes a second fan 59 therein.

A probe tube 39 is provided extending from a lower end of the vapour chamber 12 to an upper end of the vapour chamber 12. The probe tube 39 is external to the vapour chamber 12 so that air above the vapour will cool relative to the vapour. A plurality of temperature probes 37 are provided along the length of the probe tube 39 wherein the temperature readings along the tube are used to determine the level of the vapour within the vapour chamber 12.

In use, the heat transfer fluid 18 is heated until the vapour layer 22 is formed in the vapour chamber 12. That is, a volume of vapour is created and held in the vapour chamber 12 prior to commencement of the reflow soldering process. When the vapour is at the correct level to commence the heating process, power to the heating element 20 is controlled to maintain an appropriate vapour level.

The circulation fan 32 is then started to create the air flow through the heating chamber 14 from the first end to the second end. The cooling system fan 44 is then run at a speed sufficient to stop reverse airflow by pressurising the cooling system conduit 42. Alternatively, the cooling system conduit 42 may extend between sides of the heating chamber 14 such that the air flow caused by air passing through the cooling system conduit 42 is generally perpendicular to that flowing from the first internal chamber 50 to the second internal chamber 52. In this way, it will not be necessary to pressurise the cooling system conduit 42. The first fan 30 and second fan 59 are then run to pressurise the vapour chamber 12 via conduits 28 and 61, transporting vapour into the heating chamber 14 via the first conduit 34. The first fan 30 and the second fan 59 are slowed to either reduce the amount of vapour entering or stop further vapour entering the heating chamber 14.

The amount of vapour in the heating chamber 14 can be controlled during the process by operation of the first and second fans 30 and 59. Further, the amount of condensation can be reduced if required without significant reduction in temperature by reducing the speed of the first fan 30 relative to the second fan 59. When the first fan 30 runs at a speed slower than second fan 59 condensate flows through condensate return line 61 into the vapour chamber 12 where the large area permits droplets to fall to the bottom of the chamber 12. As the condensate return line 61 extends from the first internal chamber 50 to the vapour chamber 12 at a position just below the condensation trap 56, by increasing the pressure of second fan 59 relative to the first fan 30, air will flow through second conduit 61, up through the condensation trap 56 and into the first conduit 28. As air passes up through the condensation trap 56, the air above the condensation trap 56 will be relatively dry heated air which will flow back into the second internal chamber 52 for circulation by the circulation fan 32. To speed the removal of condensate further, a third fan 60 provided within the first conduit 34 can be run at a speed suitable to counter increased pressure from second fan 59.

At the end of the heating phase vapour is removed from the heating chamber 14. First fan 30 is turned off and the third fan 60 provided in the first conduit 34 may be run, along with second fan 59 to draw vapour back into the vapour chamber 12. Cooling is effected by operation of the cooling system fan 44 to pass air from the heating chamber 14 through the cooling device 54. Removing vapour and condensate by the abovementioned method prior to the cooling process speeds the cooling process and reduces the amount of condensate generated in the cooling means 54.

As in the embodiment of FIG. 1, an insulation layer 58 is provided around the vapour chamber 12. As the vapour chamber 12 is provided as a separate insulated chamber it is expected that the heat in the vapour chamber 12 will be retained well between uses of the apparatus in comparison to existing vapour phase ovens. During standby, the heater 20 could be controlled using little energy, maintaining a suitable standby vapour level. Re-heating of the heat transfer fluid to operating temperature is therefore not required, providing a benefit when compared to existing vapour phase ovens.

A means to vibrate the PCB during the reflow process is included in the preferred embodiment. The vibration improves the wetting of parts by the solder and reduces solder dags. A waterproof audio device 62 is provided in the cooling system conduit 42 adjacent the first end of the heating chamber 14. The audio device operates with a high sound pressure level, suitable to vibrate the PCB. The sound is not a constant frequency as this can cause resonances and movement of parts on the PCB. This may be in the form of a swept frequency or noise. To provide best outcomes, the sound is applied at a low level when the solder starts to melt and increases in level until fully melted. The sound is stopped before the cooling process to ensure dry joints are not created. This movement could be applied to other oven types by using high temperature speakers or other directly connected mechanical vibration means such as mass drivers.

It will be readily apparent to persons skilled in the relevant arts that various modifications and improvements may be made to the foregoing embodiments, in addition to those already described, without departing from the basic inventive concepts of the present invention.

The invention claimed is:
1. A reflow soldering apparatus comprising:
a vapour chamber in communication with a reservoir of heat transfer fluid, a heating element disposed adjacent the reservoir of heat transfer fluid, the vapour chamber and the reservoir adapted such that heating of the heat transfer fluid creates a layer of vaporised heat transfer fluid adjacent a closed lower end of the vapour chamber;
a heating chamber for receiving a board;
a first conduit connecting the heating chamber to a location in the vapour chamber above the lower end thereof; and
a pressurising device to create a pressure differential between the vapour chamber and the heating chamber, the pressurising device, the vapour chamber and the heating chamber adapted such that at least one of vapour and condensate from the layer created in the vapour chamber is transported through the first conduit to the heating chamber by the pressure differential.

2. The reflow soldering apparatus of claim 1, wherein the pressurising device comprises a first fan such that operation of the first fan causes vapour from the vapour layer to be transported to the heating chamber via the first conduit.

3. The reflow soldering apparatus of claim 2, wherein a second conduit is provided connecting an upper end of the vapour chamber with the heating chamber, the second conduit including the first fan which is operated to pressurise the air above the vapour layer such that vapour passes via the first conduit into the heating chamber.

4. The reflow soldering apparatus of claim 2, wherein operation of the first fan is varied to control the volume of vapour delivered to the heating chamber, thereby regulating the heat applied to the board.

5. The reflow soldering apparatus of claim 3, wherein there is provided a cooling system conduit including a cooling system fan, the cooling system conduit including a cooling means to cool air passing through the cooling system conduit.

6. The reflow soldering apparatus of claim 3, wherein the heating chamber is provided with a circulation fan to circulate the vapour around the heating chamber.

7. The reflow soldering apparatus of claim 6, wherein the operation of the circulation fan is varied to regulate the heat applied to the board.

8. The reflow soldering apparatus of claim 6, wherein the circulation fan is provided within the heating chamber.

9. The reflow soldering apparatus of claim 8, wherein the first conduit connects a lower end of the heating chamber with the vapour chamber such that condensate falling to the lower end of the heating chamber will return to the vapour chamber via the first conduit.

10. The reflow soldering apparatus of claim 9, wherein the first conduit is provided with a flow diverter adjacent the upper end such that when the circulation fan is circulating air and condensate within the heating chamber in a first direction, the diverter limits air and condensate passing into the first conduit.

11. The reflow soldering apparatus of claim 10, wherein the diverter is arranged such that when the circulation fan is reversed, the flow is directed down the first conduit.

12. The reflow soldering apparatus of claim 8, wherein a cooling chamber is provided in the cooling system conduit and the cooling system fan draws air from the heating chamber into the cooling chamber from which it is returned via a cooling return conduit.

13. The reflow soldering apparatus of claim 12, wherein the cooling chamber is provided with an expansion bladder or vent to allow for changes in volume in the heating and cooling process.

14. The reflow soldering apparatus of claim 2, wherein the heating chamber is provided with a first internal chamber at a first end thereof and a second internal chamber at a second end thereof, each of the first and second internal chambers including apertures into the heating chamber, wherein a circulation fan is provided in a circulation conduit connecting the first and second internal chambers such that operation of the circulation fan causes air flow from the first end of the heating chamber to the second end.

15. The reflow soldering apparatus of claim 14, wherein a condensation trap is provided adjacent the upper end of the vapour chamber and a condensate return line having a second fan is provided extending from the heating chamber to the vapour chamber below the condensation trap such that slowing operation of the first fan relative to the second fan causes air to flow up through the condensation trap and into the second internal chamber via the second conduit.

16. The reflow soldering apparatus of claim 14, wherein a cooling system conduit connects from the second internal chamber to the first internal chamber.

17. The reflow soldering apparatus of claim 15, wherein a third fan is provided within the first conduit and the third fan and the second fan are run to draw vapour back into the vapour chamber.

18. The reflow soldering apparatus of claim 5, wherein a temperature sensor is provided in the heating chamber such that temperature information provided by the temperature sensor is used to control operation of the first and cooling system fans and thereby the temperature around the board in the heating chamber.

\* \* \* \* \*